April 30, 1935.     M. TRUDEAU     1,999,743

SELF SEALING JOINT

Filed Oct. 10, 1933

INVENTOR
MEDERIC TRUDEAU
BY
ATTORNEY

Patented Apr. 30, 1935

1,999,743

UNITED STATES PATENT OFFICE 1,999,743

SELF SEALING JOINT

Mederic Trudeau, Rochester, N. Y., assignor of one-half to Charles F. Logan, Rochester, N. Y.

Application October 10, 1933, Serial No. 692,986

1 Claim. (Cl. 147—1)

This invention relates to self sealing barrel stave joints and has for its object to provide a new and improved method of finishing the sides of barrel staves so as to produce a self sealing joint between successive staves.

Another object of this invention is to provide a joint between barrel staves in which the sealing material forms a part of the stave.

A further object of this invention is to eliminate any packing and cementing material in barrel stave joints in order to insure a tight wood to wood contact between the staves.

Another object of this invention is to provide a barrel stave joint in which the sealing member remains dormant in the stave until moisture begins to penetrate into the joint and causes the sealing member to expand and form a hydraulic seal between them.

These and other objects and attendant advantages of my invention will become more readily apparent from the detailed description thereof which follows, reference being had to the accompanying drawing in which Figure 1 is a partial elevation and sectional view of a barrel showing the self sealing joint provided on one side of one of the staves and in the croze grooves of the staves.

In the several figures of the drawing like reference numerals indicate like parts.

The practically universally used method of forming a tight joint between consecutive barrel staves is to place a shim or packing into the joints between the staves and then force the staves together to compress the packing in the joints and provide a seal between them. The packing material in use to-day is mostly provided by the flag or cat-tail leaf which, when subjected to pressure between the staves, issues a juice in the form of a natural glue which together with the leaf forms the seal in the joints between consecutive staves. The insertion of the flag leaves between the staves during the manufacture of the barrel is a delicate operation which requires considerable skill and time.

Figure 3:
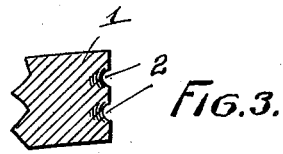
Figure 3 is an enlarged sectional view of one side of a stave showing the first step in the method of forming the sealing members in the edge thereof.
Figure 4:
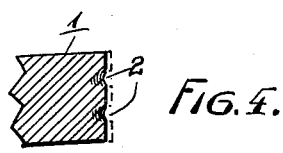
Figure 4 is a similar sectional view showing the second step in the method of forming the sealing members in the edge thereof.

In my present invention the use of any separate packing or sealing material has been eliminated by providing one or more sealing members parallel to the edges of the staves as an integral part thereof. The method with which these sealing members are formed is as follows:

Immediately after the staves are removed from the bending machine, the edges thereof are jointed to provide the angular contact surfaces which permit a number of staves to fit together and form the size barrel that is to be set up. One edge of each of the staves 1, 1 has then one or more grooves 2, 2 rolled, hammered or pressed into its contact surface substantially as illustrated in Figure 3. These grooves may be about 3/32 of an inch wide and from 3/64 to 1/16 of an inch deep, depending on the size of the stave blank. In forming these grooves into the edge of the stave, the wood fibers are therefore not cut away but are forced into the contact surface so that the displaced fibres are compressed and remain compressed in the bottom of the grooves.

The edge of the stave thus grooved is then again jointed, this time to a depth that will practically cut away the groove or grooves formed in the edge and only leave the bottom thereof with its compressed wood fibres.

Figure 1:
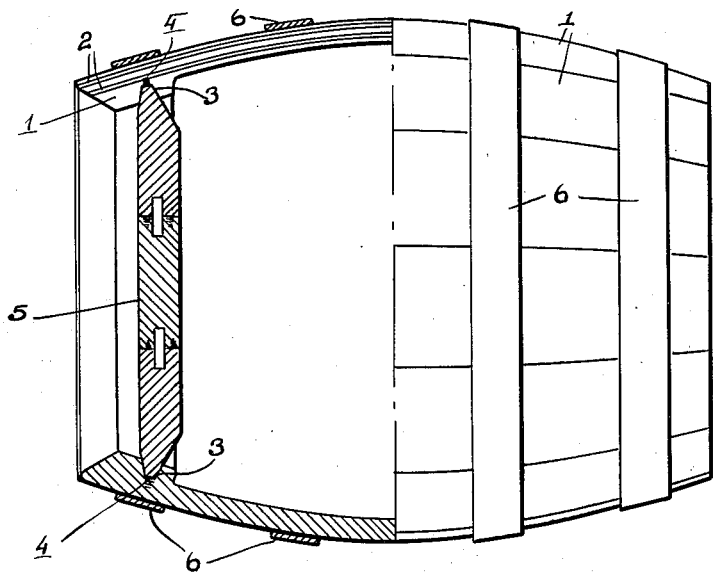

The stave blank 1 may then be finished otherwise until the croze grooves 3, 3 are cut. These grooves are cut to within about 1/32 of an inch of the desired depth and the remaining depth is forced into the stave by rolling, hammering or pressing so that the wood fibres at the bottom of the croze groove are displaced and compressed in the same way as the fibres in the edge of the staves are indicated at 4 in Figure 1.

Figure 5:
Figure 5 is a sectional view of the edge of a stave illustrating how the sealing member expands on the stave.

The staves 1, 1 are brought together in the usual manner and held together under compression with the heads 5 locked into the croze grooves by the metal hoops 6, 6. Then in case any of the joints between the staves or between the head and the staves are open and not absolutely tight so that the liquid contents of the barrel will seep into the leaky joint, the compressed fibres in the staves will absorb some of the moisture seeping into the joint. The absorption of moisture in turn will cause the compressed fibres to expand in the manner illustrated in Figure 5 and quickly dam any space in the joint which allowed the moisture to seep into it. The compressed wood fibres will expand to practically their original position on the absorption of moisture so that when an expansion takes place a hydraulic hermetic seal is formed by them.

Figure 2:
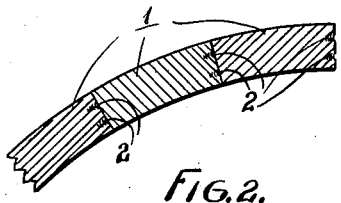
Figure 2 is an enlarged cross section of some of the staves of the barrel illustrating the self sealing joints between them.

While I have mentioned the fact that the sealing member is preferably formed on but one edge of each of the staves as illustrated in Figure 2, both edges may of course be finished in the same way and the compressed fibres in opposing edges of the staves staggered so as not to interfere with each other on the expansion thereof.

Figure 6:
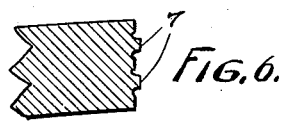
Figure 6 is a sectional view of the edge of a stave showing the first step in a modified form of the method of forming a sealing member in the stave as an integral part thereof.
Figure 7:
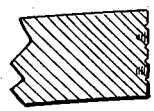
Figure 7 is a similar sectional view showing the second step in the modified form of the method of forming a sealing member in the stave as an integral part thereof.

In the modified form of producing the sealing members in the edge of a stave as illustrated in Figures 6 and 7, one or more ridges 7, 7 are originally formed in the edge of the stave 1 and by compressing these ridges level with the edge of the stave, the wood fibres forced into the edge and compressed therein are ready to expand when moisture is absorbed by them.

While I have described my invention as applied to the manufacture of barrels it is of course understood that the same method may be used in the manufacture of any wooden vessel in which an open joint will permit moisture to enter and cause the compressed wood fibres to expand and automatically dam the leaky joint.

I claim:

The method of forming a self sealing joint between abutting wood members which consists in providing a ridge in the contact surface of one of the wood members, forcing the ridge into the contact surface and compressing the wood fibres thereof to cause their expansion against the opposing contact surface of the abutting member on the absorption of moisture by the compressed fibres.

MEDERIC TRUDEAU.